Patented July 24, 1934

1,967,476

UNITED STATES PATENT OFFICE 1,967,476

DISTEMPER SERUM AND METHOD OF USE

George Watson Little, New York, N. Y.

No Drawing. Application December 5, 1932,
Serial No. 645,758

6 Claims. (Cl. 167—78)

This invention relates to the prevention and the treatment of distemper. The invention, more particularly, relates to serum preparation and use and has for an object the provision of an improved serium and method of use.

The invention aims to provide an improved serum and a method of preparing it. It further aims to provide a method of treating dogs to produce a lasting immunization against distemper and to provide treatment for dogs affected with distemper for their immunization and cure.

A method used heretofore for the prevention of distemper involves the simultaneous injection of a serum on one side of a dog and an antigen on the other. This method of treatment produces a temporary immunity against distemper. Another method heretofore used for the prevention of distemper involves the use of vaccine and living virus of Carré. The vaccine is prepared by procuring a spleen from a dog in the active stages of distemper and macerating it in normal salt solution to obtain a suspension of spleen tissue. The virility of this suspension is destroyed by the addition of one-quarter of one per cent of formalin to render it incapable of reproducing the disease.

To immunize a dog one injection of vaccine is given and fourteen days later a second injection which is followed by the injection of living virus. In this latter method a solid or lasting immunity is accomplished by using a vaccine containing a preventative agent sufficiently strong to prevent the disease when the living virus is injected. One disadvantage in such treatment is attributed to the preventative agent formalin, which causes abscesses at the point of injection.

A method for the preparation of serum heretofore used is carried out by injecting virus subcutaneously or intra-muscularly into immune animals. Such method of injection has been found to be objectionable for the reason that the strength of injected agent is lost in the process of absorption. Attempts have been made heretofore to inject virus fluid or suspension intravenously but such attempts have only resulted in thrombosis or other objectionable results which have prevented any practical application of that method.

The invention contemplates the preparation of serum of such concentration that it will hold the living virus of Carré. According to a method of the invention, living virus is injected intravenously into an immune dog to produce serum. In carrying out such intravenous injection the rate of admission and temperature of the living virus fluid is so regulated that no appreciable injury results to the dog. Advantages over the heretofore used methods of injection are manifested in elimination of losses due to absorption and in the ability to produce a concentrated serum.

In the treatment of dogs, the invention contemplates the simultaneous injection of living virus of Carré and serum for immunization against distemper. In the case of a dog having distemper in the incubation stage, serum is administered alone to arrest the disease and produce immunization. In a method of the invention serum in such concentration and quantity is administered that a solid or lasting immunity results. An immunization of such character is obtained that it cannot be broken down even by actual contact with dogs in the active stages of the disease. An immunity which is once established is permanent and lifelong, in contradistinction to methods heretofore employed which result only in a temporary immunity.

Puppies as young as six weeks of age can be injected according to the simultaneous serum-living virus treatment of this invention without danger of shock, reaction, abscesses or constitutional disturbances, or even of experiencing a rise in temperature. Thus puppies can be protected before the susceptible age, which is not true of methods now used.

In preparing the serum to be used in practicing the invention a living virus is obtained from the spleen of a distemper infected dog. A dog which is in the active stages of distemper is chloroformed and when life is extinct an incision is made in the abdominal wall and the spleen removed and placed in a sterile dish. The spleen is then weighed carefully and cut into small sections and placed between the layers of sterile gauze. Pressure is applied by twisting the gauze and the spleen therein is then thoroughly macerated. Sterile normal salt solution is added in an amount sufficient to make the equivalent of a 20% suspension of spleen tissue. In other words, a spleen weighing 20 grams would require 100 cc. of normal salt solution to make a 20% suspension. In this way all of the spleen pulp which is macerated is thrown into suspension of the normal salt solution, leaving only the connective tissue of the spleen remaining. This suspension may be frozen and kept in that state until ready for use, at which time it is melted in a water bath and centrifuged for twenty to thirty minutes in preparation for use.

This living virus suspension is injected into the jugular vein of an immune dog. The immunity of a dog must be carefully established by running a series of injections of the living virus over a period of two or three weeks to determine positively whether or not the dog is immune.

The immune dog is prepared for the injection of a living virus suspension by clipping and shaving the area known as the jugular furrow of the neck. The skin is then thoroughly cleansed and painted with iodine. By stopping the flow of blood in the jugular notch the vein is distended and its location becomes clearly discernible. A sterile hypodermic needle, which is preferably of 21 gauge, is then thrust through the skin into the jugular vein which stands out plainly due to the pressure applied. When blood flows back through the hypodermic needle a syringe containing 20 cc. of 20% suspension of the living virus, at body heat, is coupled to the hypodermic needle. The suspension is then injected very slowly into the jugular vein for a period of one minute or longer. When time is taken to inject the suspension of the warm living virus sufficiently slowly, there is no danger of causing a reaction manifested by fainting and loss of consciousness. If the centrifuged solution is injected rapidly and below the body temperature of the dog, a reaction resulting in fainting or loss of consciousness is almost certain to occur. Danger of throbosis (occlusion of the arteries with a foreign substance) is prevented by the above regulation of the admission of the suspended fluid and its temperature.

Injections of the living virus in the jugular vein may be made for three succeeding days in each week for three weeks, followed by bleeding seven days after the last injection. An injection may also be made in the jugular vein for two days which is followed by bleeding seven days after the last injection.

The dogs are prepared for bleeding by shaving and cleansing the skin area on the neck known as the jugular furrow. A solution of 2% butyn is injected in the skin and an incision one-quarter inch long is made. A large gauge needle is inserted through the wound. The jugular vein is filled up by exerting pressure with the thumb in the jugular notch so that it stands out like a cord. The needle is thrust quickly through the wall of the vein, whereupon the blood flows in a steady stream into a sterile bottle. A quantity of a weak solution of sodium citrate in the bottle prevents the blood from clotting when it is agitated continuously. Bleeding proceeds until the bottle is filled. A dog the size of a German shepherd will yield from 500 to 700 cc. of blood without any visible signs of weakness.

The blood is refrigerated and taken to the laboratory whereupon the serum is made, concentrated, preserved and bottled as follows:

1. The blood is centrifuged to remove the fibrin whereupon the plasma remaining is about 50% of the total volume of the blood.

2. The plasma is diluted 50% with water and precipitated with ammonium sulphate up to 30% saturation. It is then filtered and washed with a quantity of water equal to half the quantity of the plasma. It is then filtered again. Then both filtrates are precipitated with ammonium sulphate up to 50% saturation.

3. It is then filtered, pressed and dialyzed.

4. The filtrate is preserved with a solution of Merthiolate 1–10,000 cc. to the liter and 1% of sodium chloride added whereupon it is filtered through a Berkefeld filter and bottled in sterile bottles containing 4 cc. each. The resulting concentrated serum is a pale transparent liquid five times the strength of normal homologous serum.

In immunizing a puppy against distemper it is first determined whether the animal is in a normal healthy condition. The temperature and a microscopic test of the feces are taken to determine the presence or absence of worms (intestinal parasites). An inquiry into the history of the dog is made in order to determine whether he has ever had distemper or a cold. The serum is then removed from the bottle by inserting the hypodermic needle through the rubber diaphragm of the cork and drawn into the barrel of a sterile hypodermic needle. The skin of the shoulder or neck area is clipped, shaved, cleansed and painted with iodine. By a quick thrust of the hypodermic needle the serum (4 cc.) is injected underneath the skin.

Living virus is obtained from dried virus which is placed in a small rubber stoppered bottle containing a sterile hypodermic syringe and needle. One quarter of 1 cc. of normal salt solution is drawn into the syringe which is injected into the bottle through the rubber stopper and mixed with the dried virus whereupon it is drawn back into the syringe again. An area of skin in the shoulder or neck region is then clipped, shaved, cleansed and painted with iodine. The living virus thus obtained is injected between the layers of the skin (intradermally) by grasping the skin with the left forefinger and thumb and piercing the layers of the skin with the hypodermic needle, care being taken to direct the needle parallel to the level of the left forefinger and thumb. Care is also taken not to pierce the skin too deeply, otherwise the virus solution will be injected beneath the skin layers.

Of course, great care should be taken that all dogs be examined in order to ascertain whether they are immune, have been inoculated previously, or exposed to distemper. These factors cannot always be determined.

For example, a puppy ten weeks old may have such a history that it is difficult to know whether or not it is or has been affected with distemper. Under such circumstances it is advisable to inject 4 cc. of serum alone, subcutaneously, when there is no elevation of temperature or other symptoms present. If there are no symptoms of the disease and temperature is normal, in from two to five days a second injection of serum and simultaneously living virus are administered. In case there is a doubt that the puppy is in the incubation stage, this procedure will sufficiently protect it. It proves that the puppy is susceptible or not for in a few days, if effected, some signs will appear such as a slight nasal discharge indicating that the puppy was affected by the disease, or, if not affected, it will remain normal. The outstanding fact being that the puppy passes through only a mild form of the disease without any danger or necessity of further treatment.

Thus in the method of treatment with a serum of the invention, dogs having distemper in the incubative stage, before any signs are evident, may be treated and the disease will be minimized instead of being aggravated or promoted.

The latter method of treatment is advised in all cases where a dog may have become infected with or exposed to distemper. Dogs which have been in an environment of such nature that there is a possibility for distemper infection or contamination should be placed in quarantine and the concentrated serum administered in the usual dose of 4 cc. as often as every forty-eight hours.

A number of experiments have been made to determine relative serum concentration. It has been found that serum obtained from an immune dog that had been intravenously injected with living virus in periods of three succeeding days for three weeks and blood withdrawn seven days after the last virus injection was of such character that a concentrated serum could be produced therefrom.

A concentrated serum, as referred to herein, is intended to mean a serum of such character that it is capable of holding the living virus of Carré.

During the course of experimentation it was determined that approximately 4 cc. of the concentrated serum comprised the minimum lethal dose. The minimum dose of concentrated serum is determined, in part, by the smallest amount that is required to hold the living virus, thereby preventing it from causing distemper.

I claim:

1. In a process for preparing distemper serum, the step which comprises injecting living virus of Carré of spleenic origin intravenously into an immune dog, withdrawing blood from said dog and extracting serum therefrom.

2. In a process for preparing distemper serum, the step which comprises injecting a twenty per cent suspension of living virus of Carré intravenously into an immune dog, withdrawing blood from said dog and extracting serum therefrom.

3. In a process for preparing distemper serum, the improvement comprising injecting living virus of Carré of spleenic origin into the jugular vein of an immune dog, withdrawing blood from said dog and extracting serum therefrom.

4. A distemper preparation for the treatment of dogs comprising a serum obtained by injecting living virus of Carré of spleenic origin intravenously into an immune dog, withdrawing blood from the dog and preparing a concentrated serum therefrom adaptable for the simultaneous injection with living virus of Carré to produce distemper immunization.

5. A distemper preparation for the treatment of dogs comprising a serum obtained by injecting living virus of Carré of spleenic origin intravenously into a dog for three consecutive days of each week for three weeks, bleeding the dog approximately seven days after the last virus injection, and extracting a concentrated serum from the blood.

6. A distemper preparation for the treatment of dogs comprising a serum obtained by injecting living virus of Carré of spleenic origin intravenously into a dog in two applications, preferably on succeeding days, and approximately seven days later removing blood from said dog from which the serum is produced.

GEORGE WATSON LITTLE.

CERTIFICATE OF CORRECTION.

Patent No. 1,967,476. July 24, 1934.

GEORGE WATSON LITTLE.

It is hereby certified that error appears in the printed specification of the above numbered patent requiring correction as follows: Page 1, line 5, for "serium" read serum; page 2, line 29, for "throbosis" read thrombosis; and page 3, line 91, claim 5, strike out the words "of spleenic origin"; and that the said Letters Patent should be read with these corrections therein that the same may conform to the record of the case in the Patent Office.

Signed and sealed this 11th day of September, A. D. 1934.

Leslie Frazer (Seal) Acting Commissioner of Patents.

dose of 4 cc. as often as every forty-eight hours.

A number of experiments have been made to determine relative serum concentration. It has been found that serum obtained from an immune dog that had been intravenously injected with living virus in periods of three succeeding days for three weeks and blood withdrawn seven days after the last virus injection was of such character that a concentrated serum could be produced therefrom.

A concentrated serum, as referred to herein, is intended to mean a serum of such character that it is capable of holding the living virus of Carré.

During the course of experimentation it was determined that approximately 4 cc. of the concentrated serum comprised the minimum lethal dose. The minimum dose of concentrated serum is determined, in part, by the smallest amount that is required to hold the living virus, thereby preventing it from causing distemper.

I claim:

1. In a process for preparing distemper serum, the step which comprises injecting living virus of Carré of spleenic origin intravenously into an immune dog, withdrawing blood from said dog and extracting serum therefrom.

2. In a process for preparing distemper serum, the step which comprises injecting a twenty per cent suspension of living virus of Carré intravenously into an immune dog, withdrawing blood from said dog and extracting serum therefrom.

3. In a process for preparing distemper serum, the improvement comprising injecting living virus of Carré of spleenic origin into the jugular vein of an immune dog, withdrawing blood from said dog and extracting serum therefrom.

4. A distemper preparation for the treatment of dogs comprising a serum obtained by injecting living virus of Carré of spleenic origin intravenously into an immune dog, withdrawing blood from the dog and preparing a concentrated serum therefrom adaptable for the simultaneous injection with living virus of Carré to produce distemper immunization.

5. A distemper preparation for the treatment of dogs comprising a serum obtained by injecting living virus of Carré of spleenic origin intravenously into a dog for three consecutive days of each week for three weeks, bleeding the dog approximately seven days after the last virus injection, and extracting a concentrated serum from the blood.

6. A distemper preparation for the treatment of dogs comprising a serum obtained by injecting living virus of Carré of spleenic origin intravenously into a dog in two applications, preferably on succeeding days, and approximately seven days later removing blood from said dog from which the serum is produced.

GEORGE WATSON LITTLE.

CERTIFICATE OF CORRECTION.

Patent No. 1,967,476. July 24, 1934.

GEORGE WATSON LITTLE.

It is hereby certified that error appears in the printed specification of the above numbered patent requiring correction as follows: Page 1, line 5, for "serium" read serum; page 2, line 29, for "throbosis" read thrombosis; and page 3, line 91, claim 5, strike out the words "of spleenic origin"; and that the said Letters Patent should be read with these corrections therein that the same may conform to the record of the case in the Patent Office.

Signed and sealed this 11th day of September, A. D. 1934.

Leslie Frazer
Acting Commissioner of Patents.

(Seal)